US012773872B2

(12) United States Patent
Robles

(10) Patent No.: US 12,773,872 B2
(45) Date of Patent: Oct. 27, 2026

(54) AUTOMATICALLY ACTUATED SELF-SEALING VENT PLUG

(71) Applicant: VALCRUM, LLC, Cypress, TX (US)

(72) Inventor: Mario T. Robles, Cypress, TX (US)

(73) Assignee: Valcrum, LLC, Cypress, TX (US)

( * ) Notice: Subject to any disclaimer, the term of this patent is extended or adjusted under 35 U.S.C. 154(b) by 8 days.

(21) Appl. No.: 18/916,156

(22) Filed: Oct. 15, 2024

(65) Prior Publication Data

US 2025/0121628 A1 Apr. 17, 2025

Related U.S. Application Data

(60) Provisional application No. 63/590,676, filed on Oct. 16, 2023.

(51) Int. Cl.
*B60B 7/00* (2006.01)
*F16K 17/04* (2006.01)

(52) U.S. Cl.
CPC .............. *B60B 7/002* (2013.01); *F16K 17/04* (2013.01); *B60B 2900/211* (2013.01); *B60B 2900/212* (2013.01)

(58) Field of Classification Search
CPC ....... B60B 7/002; F16K 17/04; F16K 17/082; F16K 15/026; F16K 15/063; F16K 15/067; F16K 15/065; F16K 2200/501–502
See application file for complete search history.

(56) References Cited

U.S. PATENT DOCUMENTS

| | | | | | |
|---|---|---|---|---|---|
| 2,737,980 | A * | 3/1956 | Taylor | F16K 39/02 | 137/630.14 |
| 4,129,145 | A * | 12/1978 | Wynn | F16K 15/026 | 137/515 |
| 5,752,746 | A * | 5/1998 | Perry | B60B 7/00 | 301/108.4 |
| 6,135,144 | A * | 10/2000 | Rozek | F16K 17/06 | 137/543.17 |
| 6,564,828 | B1 * | 5/2003 | Ishida | F16K 15/026 | 137/515.5 |
| 2010/0096028 | A1 * | 4/2010 | Qiu | F16K 15/026 | 137/538 |
| 2022/0185009 | A1 * | 6/2022 | Henry | B60C 23/00336 | |

* cited by examiner

*Primary Examiner* — Michael R Reid
(74) *Attorney, Agent, or Firm* — Michael D. Marston; Botkin & Hall, LLP

(57) ABSTRACT

A vent plug having a main vent aperture that extends from an inner side into the plug and connects to a transverse vent passage that intersects the main vent aperture. The main vent aperture and the transverse vent passage are connected to provide a continuous path for fluid communication. The main vent aperture includes a conical surface that is tapered to be narrower nearer the inner side of the vent plug. A poppet is located within the main vent passage and the poppet has a stem that extends from a distal portion of the poppet. The stem has a shoulder that is opposite the distal portion. The distal portion is adjacent to the conical portion of the main vent aperture. The distal portion has an annular recess for receiving a seal. The poppet is movable between an open and closed position.

9 Claims, 9 Drawing Sheets

AUTOMATICALLY ACTUATED SELF-SEALING VENT PLUG

CROSS REFERENCE TO RELATED APPLICATIONS

This application claims priority of U.S. Provisional application 63/590,676, filed Oct. 16, 2023, which application is hereby incorporated in its entirety by reference.

BACKGROUND OF THE INVENTION

Axle assemblies of trailers have wheel hubs with lubricant chambers that surround bearings within those chambers. The lubricant can be either grease or oil. Having proper lubrication is critical to bearing life and proper function. The chambers are typically not completely filled with lubricant. This is particularly the case in oil bath type bearings, in which the chamber is partially filled with lubricant and oil forms a bath through which the bearings rotate. In either oil or grease lubricated bearings, there will likely be air in the bearing chamber.

During operation of the trailer, the temperature of the bearings can rise significantly above ambient air temperature outside of the bearing chamber. This rise in temperature will generally cause expansion of air and lubricants in the chamber. This expansion will cause a rise in the air pressure within the chamber containing the bearings. If the pressure rise is too great, it may rupture seals on the bearing chamber.

In addressing the problem of pressure rise within the bearing chambers, vents have been used to vent the bearing chamber to the ambient atmosphere. The vents have been small holes from the bearing chamber to the outside and this can be extremely problematic. While a vent to the outside may be effective, that same vent to the outside may easily become a conduit for dirt, dust, and water to enter the bearings. This is particularly the case when pressure washers are used to wash trailer wheels. Allowing contaminants to become trapped in the chamber will cause excessive wear and excessively high temperatures of the bearings that will shorten their useful life. Excessive temperature within the bearings may also damage seals around the bearings.

There remains an unmet need to allow excessive pressure to be vented from the bearing chamber, yet prevent contaminants from being drawn into the bearing chamber through the vent path.

DETAILED DESCRIPTION OF INVENTION

Figure 1:
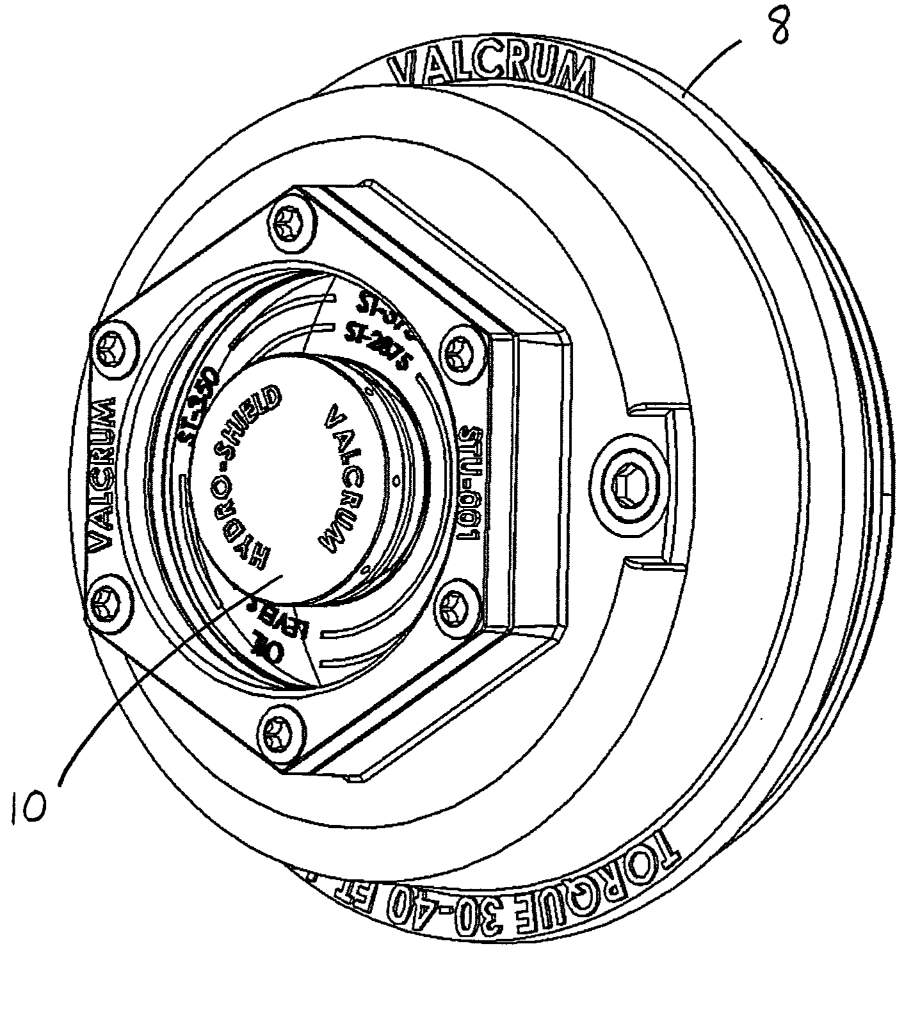
FIG. 1 is a perspective view of a hubcap with the plug of the present invention installed.
Figure 2:
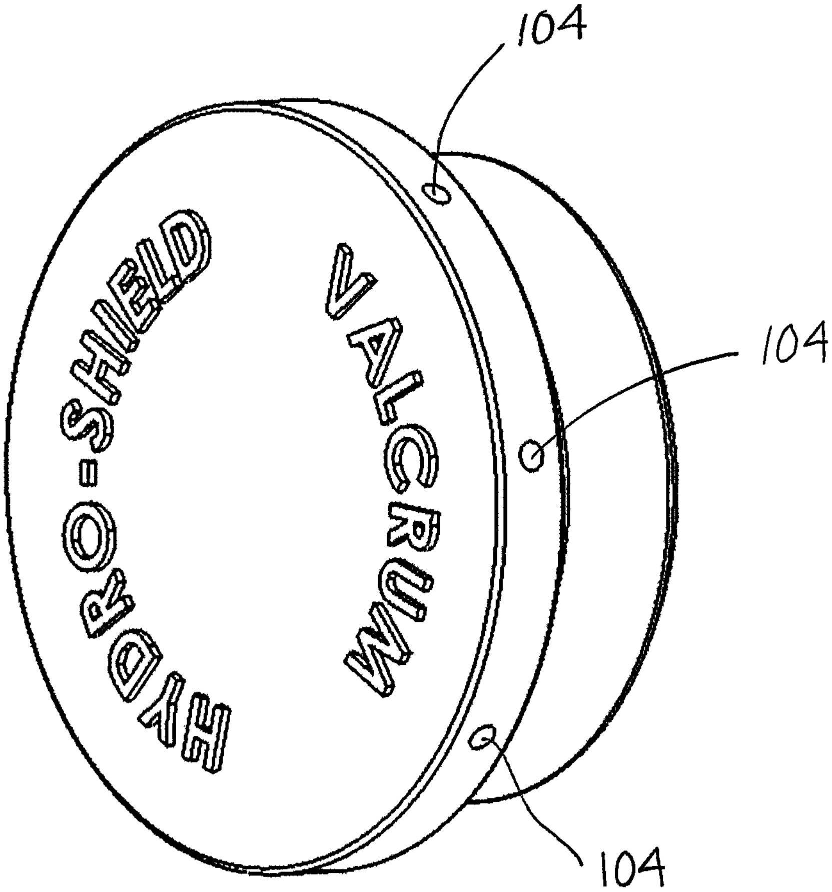
FIG. 2 is a perspective view of the plug shown in FIG. 1 outside of the hubcap.
Figure 3:
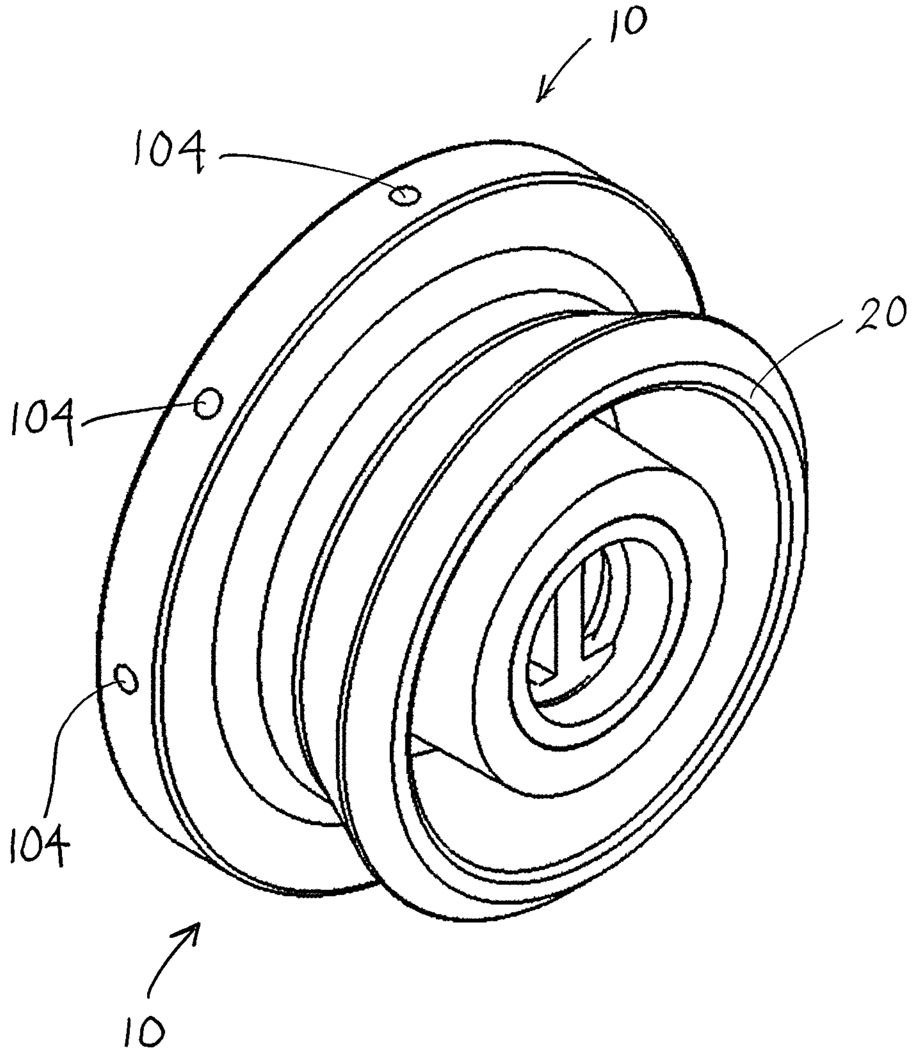
FIG. 3 is a perspective view of the plug shown in FIG. 2 showing the inner side that faces the bearings within the hub.
Figure 4:
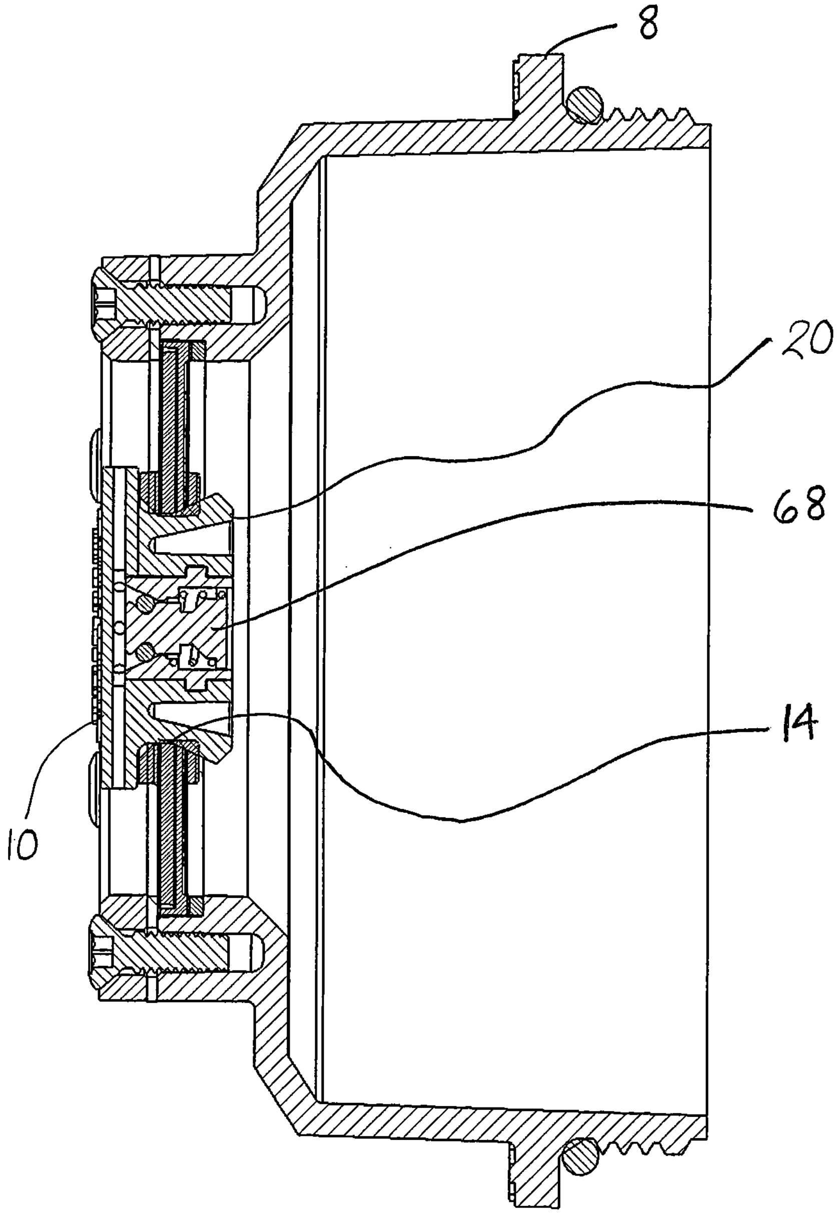
FIG. 4 is a sectional view sectional view of the hubcap shown in FIG. 1 through the center.
Figure 5:
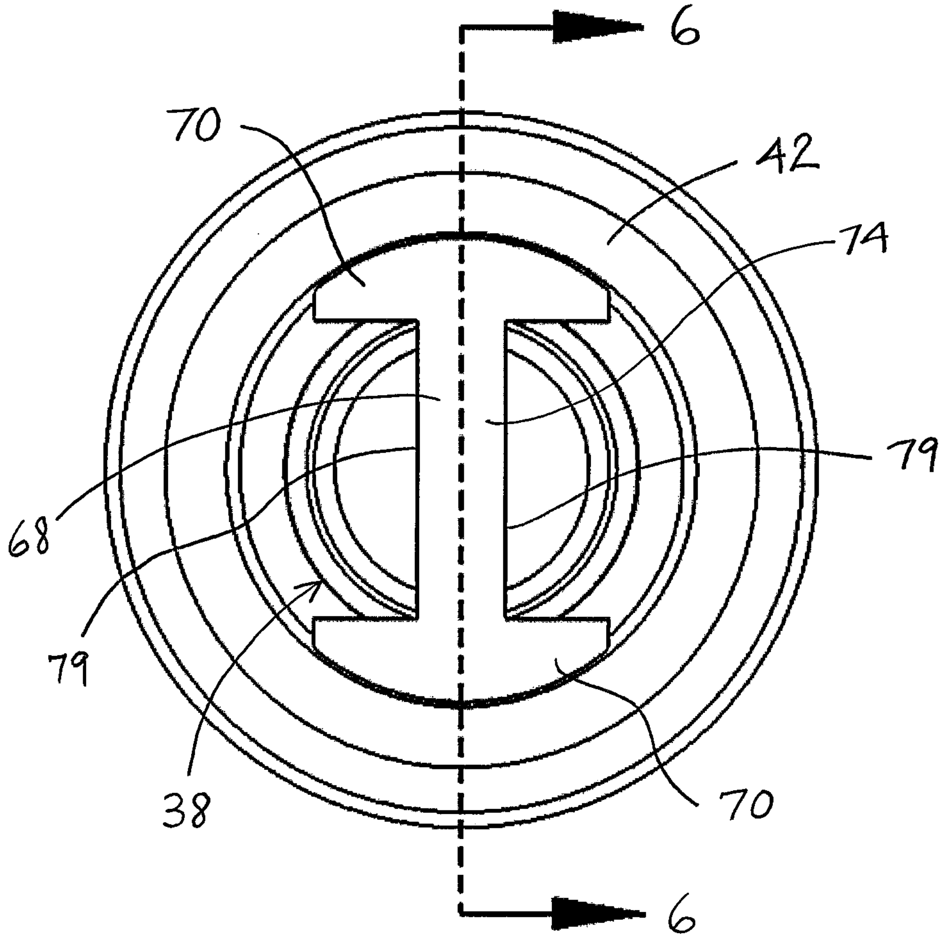
FIG. 5 is a rear view of the valve assembly within the plug shown in FIGS. 1-4.

FIG. 1 shows a perspective view of a hubcap 8 into which a plug 10 is inserted. The hubcap 8 fits into the hub and seals the chamber holding wheel bearings. The hub and bearings are not shown but the use of a hubcap to seal the open end of a bearing chamber is well known in the trailer industry where the plug 10 of the present invention is particularly useful. The plug 10 fits into a hole 14 in the hubcap 8.

The plug 10 has an inner surface 20 that faces toward the bearings when it is installed in a hubcap 8. The plug 10 has an apron 26 that is designed to be on the inside of the hubcap 8 when the plug 10 is installed within it. The apron 26 has a retention groove 28 that is designed to be an interference fit within the hole 14 of the hubcap 8. The plug 10 is typically made of an elastomeric material having a relatively stiff durometer (approximately 75) and will resiliently bend to form an airtight and watertight seal with the hubcap 8. Because the apron 26 is larger than the hole 14 into which the plug 10 is installed, it will be securely retained in the hubcap 8. The apron 26 surrounds an annular channel 32 that allows for flexing of the apron 26 inwardly as it is installed into the hubcap 8.

Figure 9:
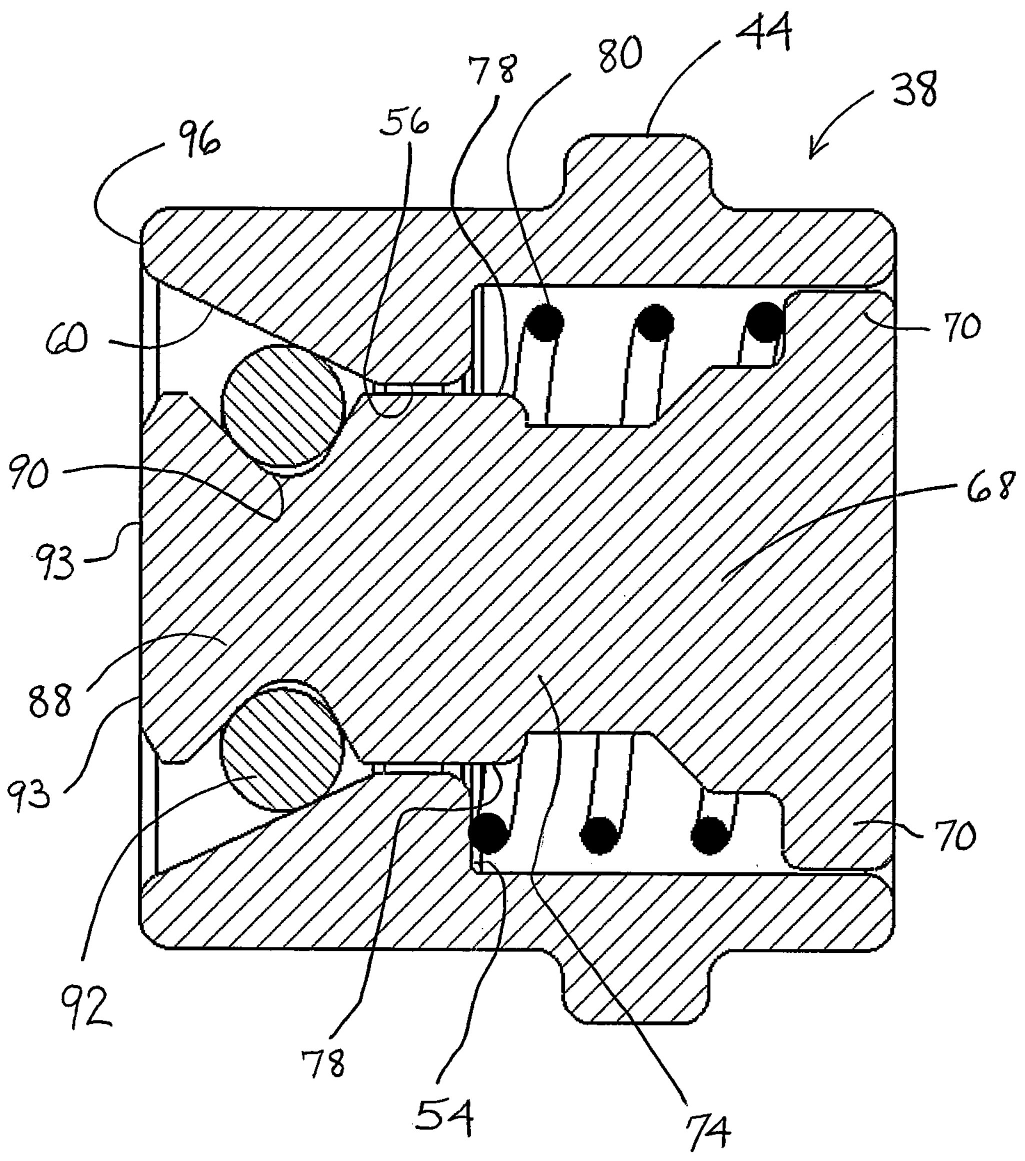
FIG. 9 is a sectional view through the center of the valve assembly in the closed position as shown in FIG. 7, this is a magnified view showing just the valve assembly apart from the plug.

Within the plug 10 is a valve assembly 38. FIG. 9 shows the valve assembly 38 that is a separate part from the plug 10 itself. The valve assembly 38 may be made of harder materials than the plug 10 itself and is insertable within the plug 10 itself. The valve assembly 38 may be made of metal or plastic. The valve assembly 38 has a housing 42 that is a shape of revolution designed to be insertable into the plug 10. The housing 42 has a collar 44 on its outer diameter 48 and the outer diameter 48 on either side of the collar 44 is generally a cylindrical shape. The housing 42 has a main vent aperture 50 that extends through the housing 42. The main vent aperture 50 includes an inner shoulder 54 near side of the housing 42 facing the inner surface 20 of the plug 10. Directly adjacent to the inner shoulder 54 in the main vent aperture 50 is a pilot diameter 56 that is a relatively narrow diameter adjacent to the inner shoulder 54. The pilot diameter 56 is a smooth guiding surface that continues into a conical surface 60. The conical surface 60 is narrower near the side of the housing 42 that faces the inner surface 20 of the plug 10. The conical surface 60 is widest near the end of the housing 42 opposite where it faces the inner surface 20 of the plug 10.

Figure 6:
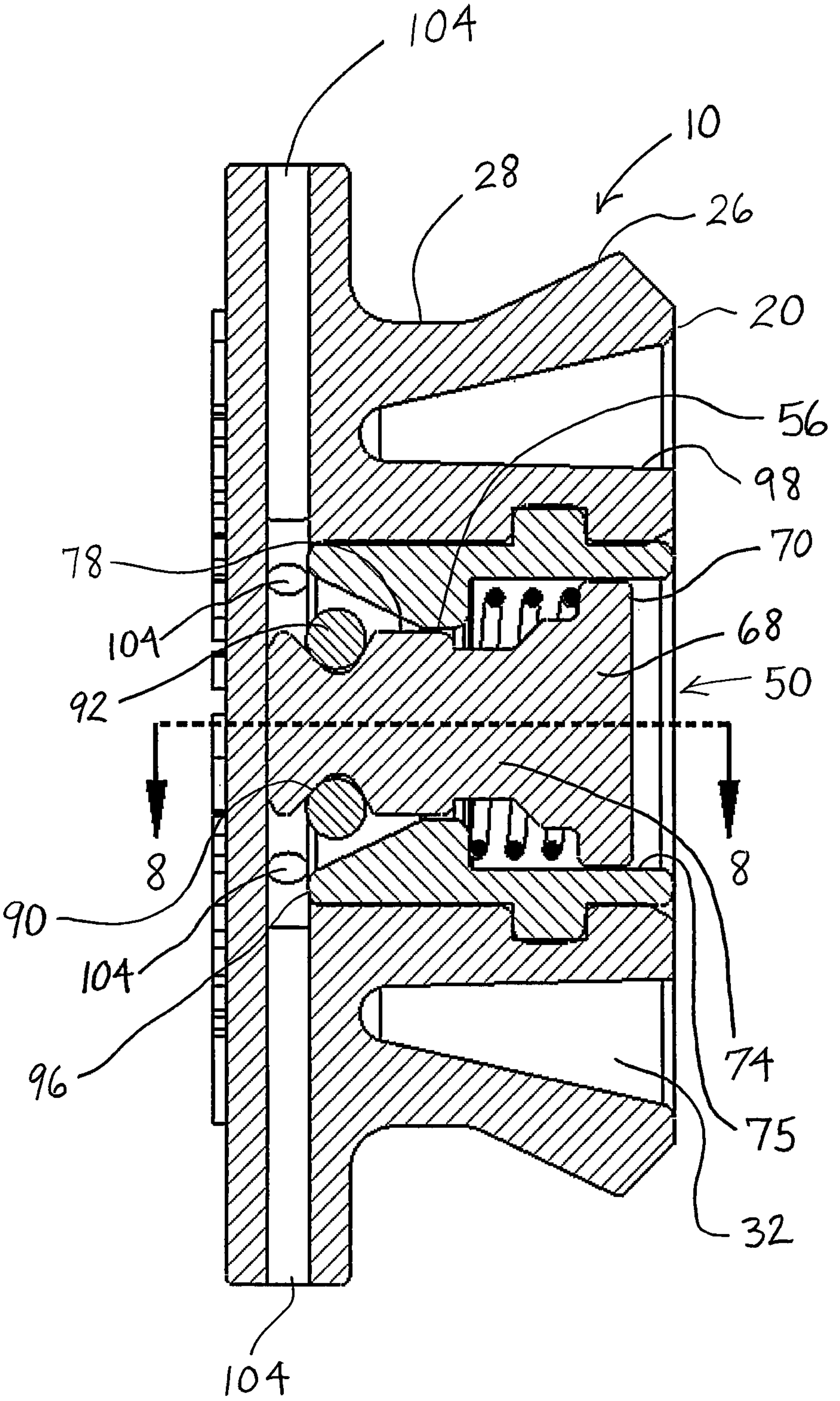
FIG. 6 is a sectional view through the valve assembly taken about the line 6-6 in FIG. 5, with the poppet valve in the open position, and shows the entire plug with the valve assembly installed in the plug.
Figure 7:
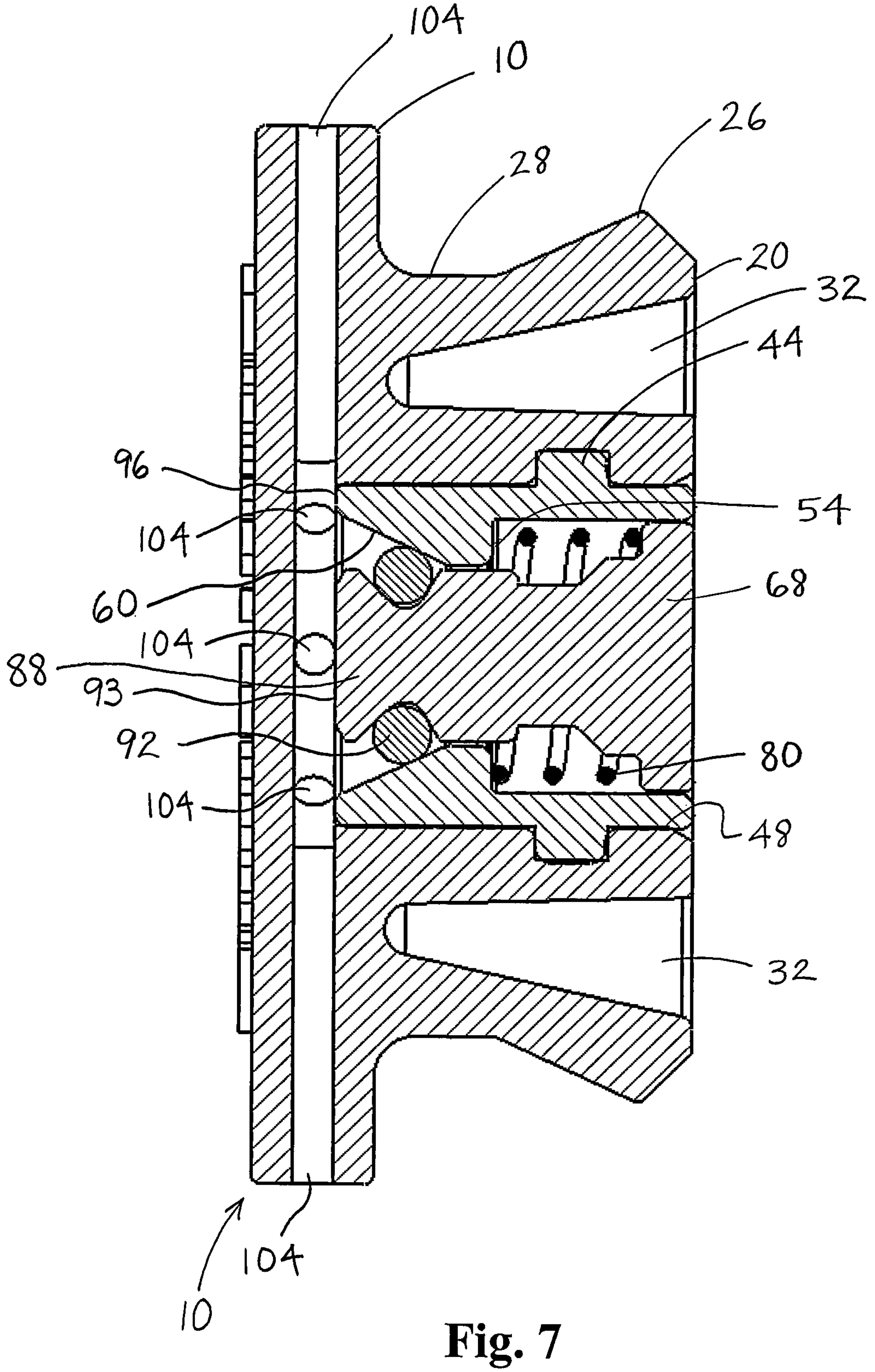
FIG. 7 is the sectional view of FIG. 6 showing the poppet valve in its closed position.
Figure 8:
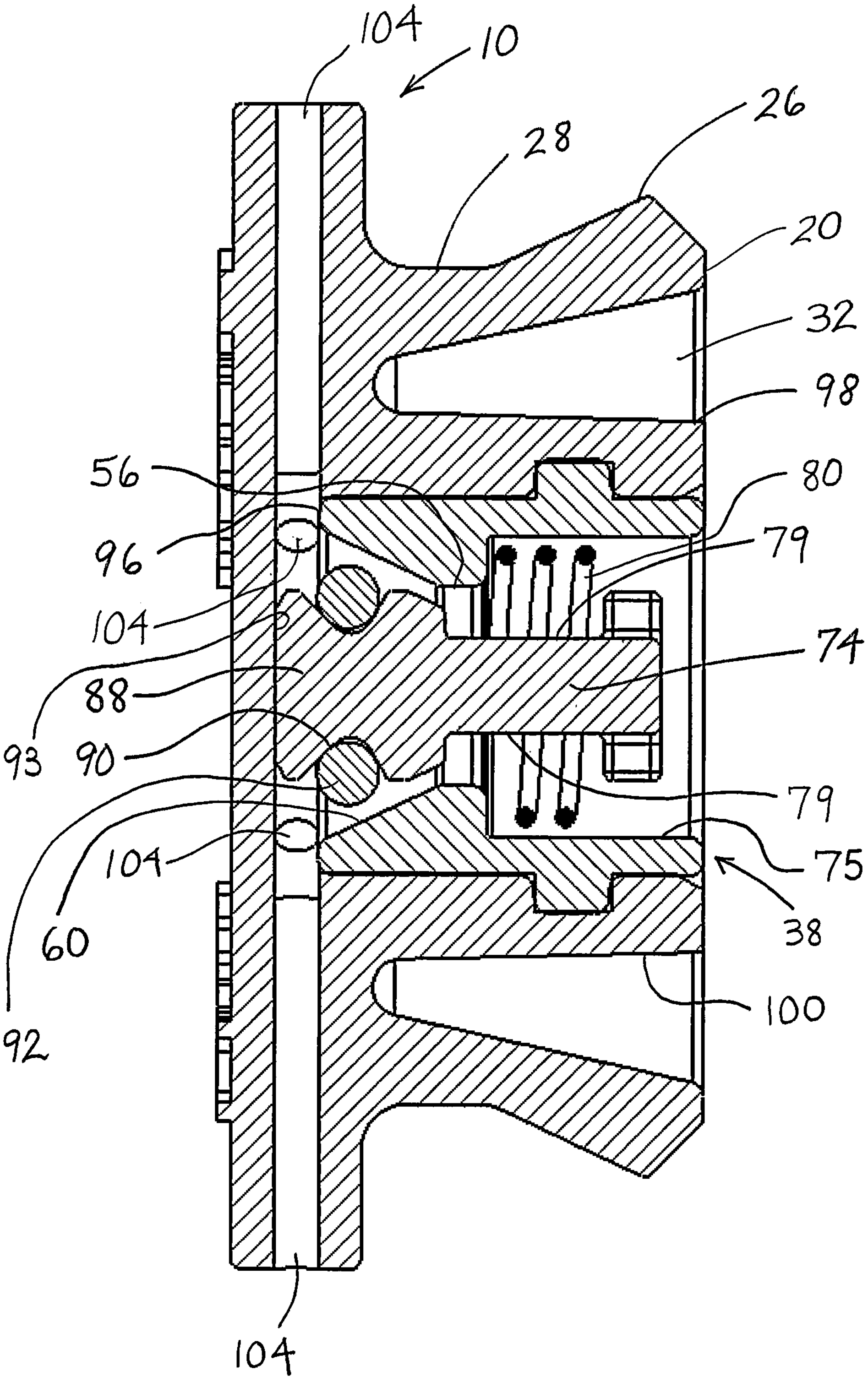
FIG. 8 is a sectional view through the valve assembly taken about the line 8-8 in FIG. 6.

A poppet 68 is held within the main vent aperture 50. The poppet 68 has a pair of shoulders 70 at one end. The shoulders 70 of the poppet 68 are designed to be a clearance fit within the main vent aperture 50 near the inner surface of the plug 10. A stem 74 extends from the shoulders 70 of the poppet 68 in the opposite direction of the inner surface 20 of the plug 10. The stem 74 is a flat bar that extends away from the shoulders 70. The stem 74 has rounded sides 78 that act as a guide within the pilot diameter 56 of the main vent aperture 50. The stem 74 also has flat sides 79 that are well spaced from the pilot diameter 56 as shown in FIG. 8. A spring 80 is compressed between the shoulders 70 of the poppet 68 and the inner shoulder 54 of the main vent aperture 50. As shown in FIGS. 6-9, the spring 80 is a compression spring that circumscribes the stem 74 and pushes against the shoulders 70 of the poppet 68 and the inner shoulder 54 of the main vent aperture 50. It is contemplated that other types of springs or biasing mechanisms could be used to bias the poppet 68 in the same manner as spring 80. The rounded sides 78 of the stem 74 allow the poppet 68 to slide within the pilot diameter 56 of the main vent aperture 50 without cocking in a fashion that would cause the poppet 68 to jamb at an awkward angle. The clearance between the rounded sides 78 and the pilot diameter 56 is small enough that simultaneous engagement of both rounded sides 78 is possible on opposite sides of the stem 74. It should also be noted that the shoulders 70 are rounded to slidingly engage an inboard diameter 75 in the main vent aperture 50 and this also facilitates smooth movement of the poppet 68. The shoulders 70 slide smoothly within the inboard diameter 75 and this sliding enhances the guided length of the poppet 68 so that it is less likely to cock within the pilot diameter 56. This configuration significantly reduces the chance that the poppet 68 will bind in the pilot diameter 56. The shoulders 70 are centered with respect to the rounded sides 78 of the stem 74. This allows unobstructed passage of fluid around the stem 74 through the pilot diameter 56 because of the relatively distant spacing of the flat sides 79 and the pilot diameter when compared to the much close spacing of the rounded sides 78 and the pilot diameter 56. As can be seen in FIGS. 6 and 7, the poppet 68 is movable in an axial direction from a closed position (shown in FIG. 7) to an open position (shown in FIG. 8). The poppet 68 has a distal portion 88 that is opposite to its shoulders 70. The distal portion 88 of the poppet 68 is different than the stem 74 in that it is a shape of revolution having a recess 90 for receiving an O-ring 92 that acts as a seal. The distal portion 88 of the poppet 68 has an outer end surface 93. The O-ring 92 is an elastomeric part that has a larger outer diameter than the pilot diameter 56 of the main vent aperture 50. The recess 90 is located on the poppet 68 so that when the spring 80 is fully compressed, the recess 90 will be located beyond the outer surface 96 of the valve assembly 38. Compressing the spring 80 to near its fully compressed height will leave the recess 90 outside of the housing 42 so that is accessible for installing the O-ring 92 into the recess 90. Once the O-ring 92 is snugly held into the recess 90 by its own elasticity tightening it down within the recess 90, the spring 80 will bias the poppet 68 into its closed position. The closed position of the poppet 68 pulls the O-ring 92 into sealing contact with the conical surface 60. Due to the size of the O-ring 92, the spring 80 cannot pull the poppet 68 back through the pilot diameter 56 once the O-ring 92 is installed. The elastomeric nature of the O-ring 92 will ensure a continuous annular seal around the conical surface 60 for the entirety of its contact with the conical surface 60. The conical surface 60 serves as a self-centering feature to locate the poppet 68 at a central location within the main vent aperture 50. This self-centering nature of the interface between the O-ring 92 ensures that when poppet 68 is moved it begins movement from a position that is centrally aligned within the main vent aperture 50. As such, the likelihood that the poppet 68 will bind or be hindered from movement within the main vent aperture 50 is minimal.

The valve assembly 38 is designed to be installed as a unit into the plug 10. An inner boss 98 is spaced from the apron 26 by the annular channel 32 so that the annular sidewall 100 of boss 98 may flex outwardly to accept the valve assembly 38 being pushed into the plug 10. Once the valve assembly 38 is installed into the plug 10, there is a continuous flow path through the main vent aperture 50 and into transverse holes 104 in the plug 10 itself. The transverse holes 104 act as transverse vent passages. The transverse holes 104 intersect with the main vent aperture 50 to form a continuous flow path through the plug 10 when the poppet 68 is in its open position. Because the valve assembly 38 is tightly held within the plug 10 and has a collar 44 the only flow path for any fluid out of the plug 10 is through the main vent aperture 50 and the transverse holes 104. The spring 80 is chosen so that a slight pressure rise will allow excess fluid (most likely air) to be expelled through the main vent aperture 50 and outwardly through the transverse holes 104. As fluid is expelled thought the plug 10 as described, contaminants will not flow backwardly into the plug 10 and into the main vent aperture 50 where the contaminants will damage the bearings behind the hubcap 8. The transverse holes 104 prevent direct entry for contaminants, particularly water from pressure washers, because the contaminants would be required to make a ninety degree turn before impinging on the closed poppet 68. In other words, the sharp turn lessens the force by which contaminants could enter the main vent aperture 50. The seal of the O-ring 92 is further distanced from the transverse holes 104 because it is below the outer surface 96 of the housing 42 and not in the same plane as the transverse holes 104 where they connect with the main vent aperture 50. The outer end surface 93 is at or below the outer end surface 96 of the valve assembly 98 in the closed position and that allows an unobstructed path for water to travel through oppositely located transverse holes 104. This location of the outer end surface 93 of the poppet 68 is located to not intersect or obstruct the transverse holes 104. In the closed position of the poppet This configuration allows the larger diameter of the distal portion 88 of the poppet 68 to shield the O-ring 92 from damage and contaminants. This shielding will minimize the likelihood that pressure washing the plug 10 will force contaminants past the O-ring 92 as it seals on the conical surface 60. Operation of the trailer onto which the plug 10 is installed will generate centrifugal forces that will tend to fling contaminants out of the transverse holes 104.

The poppet 68 of the present invention facilitates a rapid response to any pressure rise within the bearing chamber behind the hubcap 8. As can be seen in FIG. 8, a predetermined rise in pressure behind the hubcap 8, will move the poppet 68 in an axial direction into its open position as shown in FIG. 8. The shape of the stem 74 facilitates a high flow rate of fluid through the main vent aperture 50. Because the stem 74 is generally rectangular in cross section, with rounded sides 78, there is a significant amount of space between the stem 74 and the pilot diameter 56 adjacent to the flat sides of the stem 74, as shown in FIG. 8. This facilitates rapid discharge of fluid past the poppet 68, and then a quick return of the poppet 68 into the closed position because the spring 80 will bias the poppet 68 into the closed position once there is no pressure differential. The rapid flow of fluid past the poppet 68 when it is in its open condition is also enhanced by the fact that the distal portion 88 is generally conical adjacent to the conical surface 60. It is possible in certain circumstances that the bearing chamber behind the hubcap 8 will have a lower pressure than the ambient air outside of the bearing chamber. This condition is referred to as a negative pressure condition. The negative pressure condition may be caused by the opposite conditions that cause a pressure rise in the bearing chamber. At times, a rapid cooling of the bearing chamber can occur in a marine application. Submerging a hub to which the hubcap 8 is attached can cause this negative pressure condition. When that negative pressure condition arises, it is usually a transient condition and the plug 10 can accommodate a negative pressure condition by having the O-ring 92 deform as the poppet 86 is pulled slightly inward toward the bearing chamber. In this manner, the poppet 68 can minimize the negative pressure condition. In this manner of function, the poppet 68 functions as a bidirectional valve that can stabilize pressure in a negative pressure condition and a positive pressure condition where the pressure in the bearing chamber is higher than outside ambient air.

What is claimed is:

1. A vent plug comprising:

a plug body having an apron terminating at an inner surface, including a retention groove being narrower than said apron adjacent to said inner surface and said retention groove being narrower than portions of said apron adjacent to said retention groove;

a valve assembly contained within said plug body, said valve assembly having a housing having a main vent aperture including an inboard diameter terminating at an inner shoulder, said inboard diameter adjacent to a pilot diameter in fluid communication with said inboard diameter, said pilot diameter continuing into a conical surface, a poppet having a stem extending from a distal portion of said poppet and said stem having shoulders opposite said distal portion and spaced from said distal portion, said distal portion of said poppet adjacent to said conical surface, said distal portion including an annular recess for receiving a seal, said poppet movable between a closed position, in which said seal contacts said conical surface, and an open position wherein said seal is spaced from said conical surface, said stem having flat sides and rounded sides, said rounded sides of said stem for slidingly engaging said pilot diameter and said shoulders simultaneously engaging said inboard diameter which is larger than said pilot diameter;

said main vent aperture extending from an inner side of said plug body to an outer side of said plug body and connecting to a transverse vent passage in said plug body intersecting said main vent aperture, said transverse vent passage being located outward of said distal end of said poppet, said main vent aperture and said transverse vent passage connected to provide a continuous path for fluid communication when said distal end of said poppet is spaced from said conical surface in said open position, said continuous path for fluid communication being around said stem;

a spring located between said shoulder of said main vent aperture and said shoulder of said poppet, said spring biasing said poppet into said closed position.

2. The vent plug of claim 1, wherein said transverse aperture intersects said main vent aperture at a location located radially outward of said poppet.

3. The vent plug of claim 2, wherein said apron being cantilevered from said plug body.

4. A vent plug comprising:

a plug body having an apron terminating at an inner surface, including a retention groove being narrower than said apron adjacent to said inner surface and said retention groove being narrower than portions of said apron adjacent to said retention groove;

a valve assembly contained within said plug body, said valve assembly having a housing having a main vent aperture including an inboard diameter terminating at an inner shoulder, said inboard diameter adjacent to a pilot diameter in fluid communication with said inboard diameter, said pilot diameter continuing into a conical surface, a poppet having a stem extending from a distal portion of said poppet and said stem having shoulders opposite said distal portion and spaced from said distal portion, said distal portion of said poppet adjacent to said conical surface, said poppet movable between a closed position, and an open position wherein said poppet is spaced from said conical surface, said stem having flat sides and rounded sides, said rounded sides of said stem for slidingly engaging said pilot diameter and said shoulders simultaneously engaging said inboard diameter which is larger than said pilot diameter;

said main vent aperture extending from an inner side of said plug body to an outer side of said plug body and connecting to a transverse vent passage in said plug body intersecting said main vent aperture, said main vent aperture and said transverse vent passage connected to provide a continuous path for fluid communication when said distal end of said poppet is spaced from said conical surface in said open position, said continuous path for fluid communication being around said stem;

a spring located between said shoulder of said main vent aperture and said shoulder of said poppet, said spring biasing said poppet into said closed position.

5. The vent plug of claim 4, wherein said transverse aperture intersects said main vent aperture at a location located radially outward of said poppet.

6. The vent plug of claim 4, wherein said apron being cantilevered from said plug body.

7. The vent plug of claim 4, wherein said distal portion of said poppet includes an annular recess for receiving a seal.

8. The vent plug of claim 4, wherein said vent passage is located outward of said distal end of said poppet.

9. The vent plug of claim 8, wherein said distal portion of said poppet includes an annular recess for receiving a seal.

* * * * *